United States Patent
Ketonen

(10) Patent No.: US 7,185,686 B2
(45) Date of Patent: Mar. 6, 2007

(54) FEEDER DEVICE IN A TIMBER HARVESTER

(76) Inventor: Lauri Ketonen, Huvilakatu 15, FI-64100 Kristiinankaupunki (FI)

( * ) Notice: Subject to any disclaimer, the term of this patent is extended or adjusted under 35 U.S.C. 154(b) by 0 days.

(21) Appl. No.: 10/526,101

(22) PCT Filed: Sep. 18, 2003

(86) PCT No.: PCT/FI03/00680

§ 371 (c)(1),
(2), (4) Date: Feb. 24, 2005

(87) PCT Pub. No.: WO2004/030443

PCT Pub. Date: Apr. 15, 2004

(65) Prior Publication Data

US 2006/0086414 A1    Apr. 27, 2006

(30) Foreign Application Priority Data

Oct. 4, 2002   (FI) ................................. 20021770

(51) Int. Cl.
*A01G 23/095* (2006.01)
*B27B 25/02* (2006.01)
*B27B 25/04* (2006.01)

(52) U.S. Cl. ................. 144/4.1; 144/24.13; 144/245.2; 144/246.1

(58) Field of Classification Search ................. 144/4.1, 144/34.1, 34.5, 242.1, 245.1, 245.2, 246.1, 144/248.7, 250.17, 24.13; 198/626.1, 692, 198/606, 626.4; 83/435.2, 447, 436.1, 448, 83/436.15

See application file for complete search history.

(56) References Cited

U.S. PATENT DOCUMENTS

| 4,753,338 | A |   | 6/1988 | Ketonen |
| 4,883,159 | A | * | 11/1989 | Ketonen ..................... 198/692 |
| 5,186,227 | A | * | 2/1993 | Eriksson ................ 144/250.17 |
| 5,735,325 | A | * | 4/1998 | Timperi et al. ........ 144/250.17 |
| 6,202,719 | B1 | * | 3/2001 | Ketonen .................. 144/24.13 |

* cited by examiner

*Primary Examiner*—Lowell A. Larson
*Assistant Examiner*—Shelley Self
(74) *Attorney, Agent, or Firm*—Fildes & Outland, P.C.

(57) ABSTRACT

The invention relates to a feeder device in a timber harvester, which includes a frame, a 3-row roller chain arranged to be rotated around a drive sprocket, a turnover member and roll guides, which roll guides extend for a great length of a gripping side of the feeder device, between the drive sprocket and the turnover member, and in which roller chain there are rows of links staggered relative to each other by transverse pins, comprising a middle row of links with smaller rollers and outer rows of links with larger rollers, each row of links corresponding to its own roll guide.

9 Claims, 3 Drawing Sheets

FEEDER DEVICE IN A TIMBER HARVESTER

CROSS-REFERENCE TO RELATED APPLICATION

This application is a national phase application of International Application No. PCT/FI2003/000680 filed Sep. 18, 2003.

The present invention relates to a feeder device in a timber harvester, which feeder device includes a 3-row roller chain arranged to be rotated around a drive sprocket, a turnover member and rolling guides, which extend over a great length of the adhesion side between the drive sprocket and the turnover member, and in which roller chain there are rows of links staggered relative to each other by transverse pins, comprising a middle row of links and outer rows of links, each row of links including rollers rolling in the corresponding rolling guides and set in bearings in the transverse pins, and in which the drive sprocket is arranged to drive by its teeth the middle row of links of the roller chain through its rollers. In this case, the term 'timber harvester' must be understood quite broadly as encompassing very different kinds of devices for handling fibre and log timber.

BACKGROUND OF THE INVENTION

A timber harvester feeder device according to the preamble is known from the applicant's previous publications WO 85/05589 and WO 99/25526. A timber harvester usually has two feed tracks jointed oppositely to each other, stripping blades, and a cutting device. The frame of the feed track is installed on articulated arms. The roller chain is fitted around a drive sprocket, driving the middle row of links, and a turnover member, generally a pair of idler wheels. The dimensions of the roller chain are adapted to the dimension of the toothing of the drive sprocket, which has limited the diameter of the rollers.

A track feed has obvious advantages over drive rollers. The first publication deals with a situation, in which rolling bases and roller chains are used. This substantially improves the durability of the track feed, as the solution allows the loading to be transferred directly to the sliding base, thus avoiding loading peaks in the track. The latter publication discloses a curved rolling base, so that the track-feed device imitates a large drive roller, the length of the grip with the timber being much longer than in any real drive roller, the diameter of which remains much smaller for practical reasons. Due to the curved rolling base, the mechanism is simplified, as one joint of the feed device can be eliminated. A crawler track is a special roller chain, in which the rollers and pins wear in use. In order to reduce friction, the rollers are equipped with bushings. Correspondingly, the rolling bases wear in use and, like the crawler track, are preferably made to be replaceable. In known rolling bases, grooves must be machined between the rollers, to prevent the links from coming in contact with the base.

SUMMARY OF THE INVENTION

The present invention is intended to create an improved feeder device for a timber harvester, which will have a long operating life and excellent reliability. The feeder device is an essential component in a timber harvester and has a significant effect on the total weight of the entire machine. The invention is intended to reduce the size of and weight of the track feeder device, without impairing its durability.

These objectives are achieved by a feeder device in a timber harvester, which includes a frame, a 3-row roller chain arranged to be rotated around a drive sprocket, a turnover member and rolling guides, which rolling guides extend for a great length on the adhesion side, between the drive sprocket and the turnover member, and in which roller chain there are rows of links staggered relative to each other by transverse pins, comprising a middle row of links and outer rows of links, each row of links including rollers rolling in the corresponding rolling guides and set in bearings in the transverse pins, and in which the drive sprocket is arranged to drive by its teeth the middle row of links of the roller chain through its rollers, characterized in that the outer rows of links of the roller chain are equipped with rollers of a greater diameter than the rollers of the middle row of links, in which case the middle rolling base is correspondingly raised relative to the outer rolling bases. The invention is largely based on the observation that the rolling base mainly wears only at the sides, but that the size of the outer rows of links is determined by the middle row of links, in which the rollers are adapted to the driving sprocket. Wear is thus generally limited to the side rows of the crawler track. The row in the middle of the track generally does not wear, even though it is subjected to the stress of the drive sprocket driving the track. Therefore the outer rows of links can, in fact, be equipped with larger rollers, provided that the rolling base is also adapted to rollers of different sizes.

These and other features and advantages of the invention will be more fully understood from the following detailed description of the invention taken together with the accompanying drawings.

DETAILED DESCRIPTION OF THE INVENTION

Figure 1:
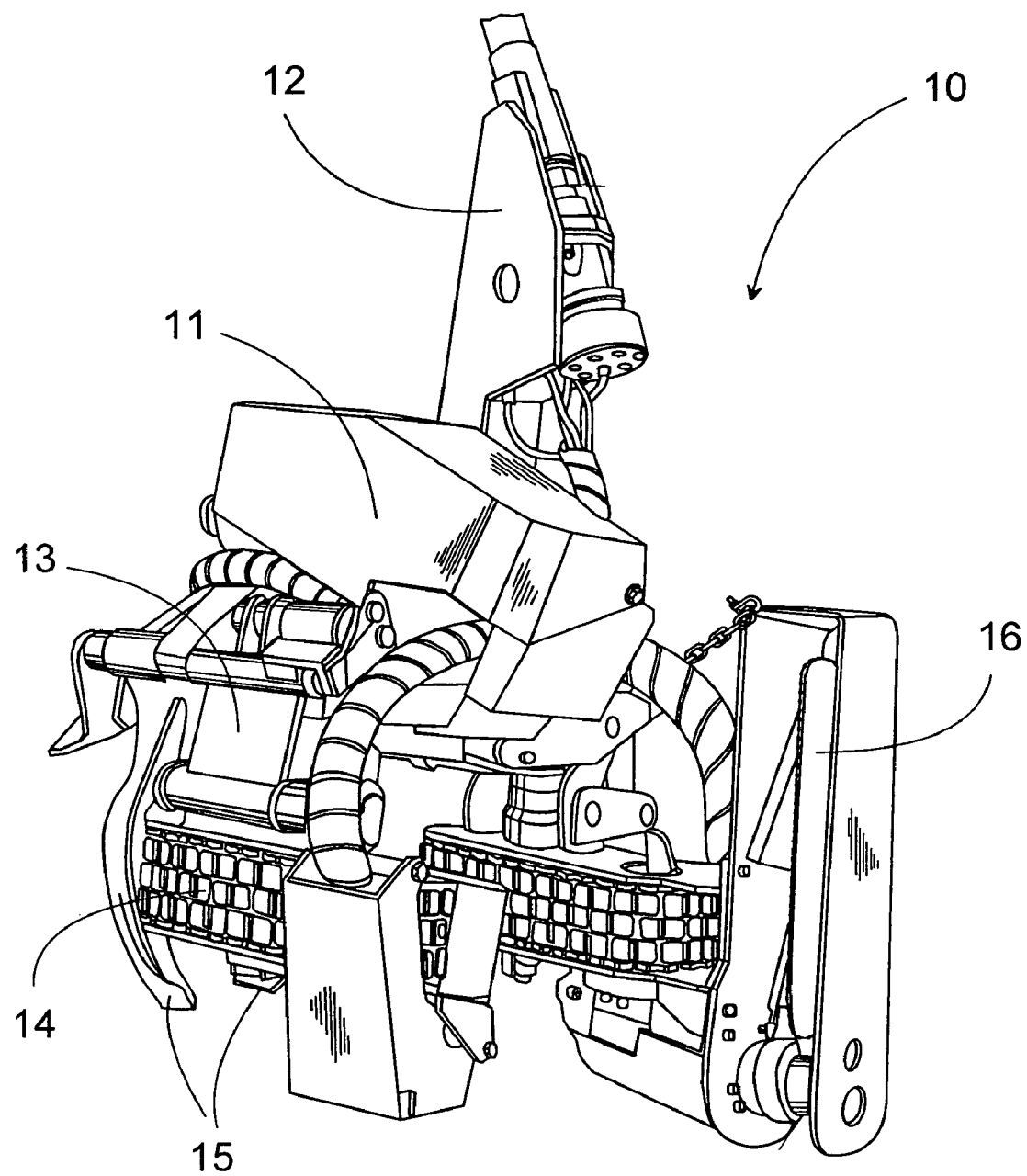
FIG. 1 shows a timber harvester, equipped with track-feed devices

FIG. 1 shows one timber harvester 10, which includes a frame 11, a suspension device 12, two feed tracks 14 jointed oppositely to each other, stripping blades 15, and a cutting device 16 (a saw). The feed tracks 14 and the stripping blades 15 are operated with the aid of hydraulic cylinders (not shown) and they press the tree being processed into their throat. The feed tracks 14 pull the tree through the throat.

The frame of the feed track 14 is installed on articulated arms 13. The feed track 14 is a 3-row roller chain fitted around a drive sprocket, a turnover member, and roll guides, which extend over a great length of the gripping side, between the drive sprocket and the turnover member.

The weight of the timber harvester can be reduced by making smaller crawler-track feeder devices. The pressure, on the surface of the timber, of a crawler track rolling even on a curved base is not too great, even though the contact surface between the track and the timber is shorter than in a feeder device equipped with a straight roll base. The reduction in weight is therefore limited only by the surface pressure between the crawler track and its base and subsequently by the wear of their components that roll mutually relative to each other.

In the feeder device according to the invention, the crawler track is a 3-row track. Though the chain can be a traditional 3-row roller chain, in which the links are next to each other, they are preferably staggered relative to each other (WO 85/05589), in order to equalize the loading. The drive sprocket is located at the middle row 17.2, so that the dimensions of the construction of this row is based on the drive event. Both the outer rows 17.1 of the crawler track are, in turn, equipped with rollers of the greater possible diameter. This creates a 3-row crawler track, in which the diameter of the rollers of the inner row is a maximum of 80% of their spacing and usually less. In turn, the rollers of the outer rows have a diameter that is at least 85% of the spacing of the elements of the crawler track. In practice, the roller diameter of the inner row of the roller chains is about 70% of the spacing. In the outer rows, a diameter that is 85–95% of the spacing can be preferably used. It can be stated that in general the outer rollers 33.1 have a diameter 10–25% greater than that of the middle rollers 34.1 Preferably, at least the outer rollers 33.1 are equipped with bushings 33.3.

If the diameter of the outer row increases, the surface pressure against the roll base will decrease, the velocity between the roller and the internal bushing will decrease, and simultaneously the mutual rolling distance between them will decrease. This all increases the life of the crawler track. But now the roll base (except for the middle row) can also be advantageously made in the form of plates, without separate rails. As the rollers of the outer rows are large, the outer surface of the roller is pushed outside of the outer surface of the side plates. No space is then required on the roll base for the side plates of the outer rows. A roll base of this kind can be manufactured effectively using large blades, even though more material must be removed than in a base equipped with grooves.

Figure 2:
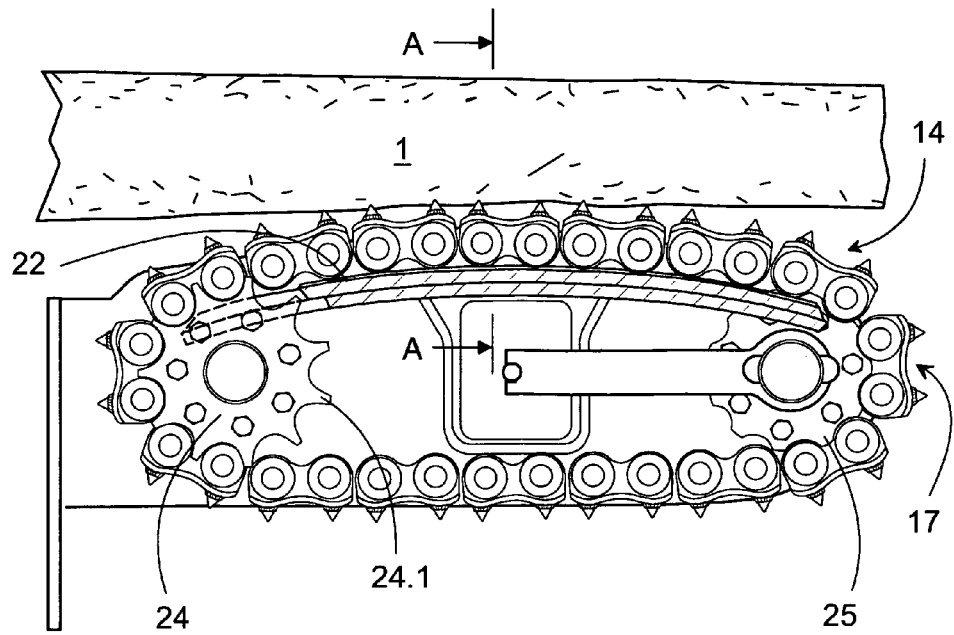
FIG. 2 shows a side cross-section of the feed device
Figure 3:
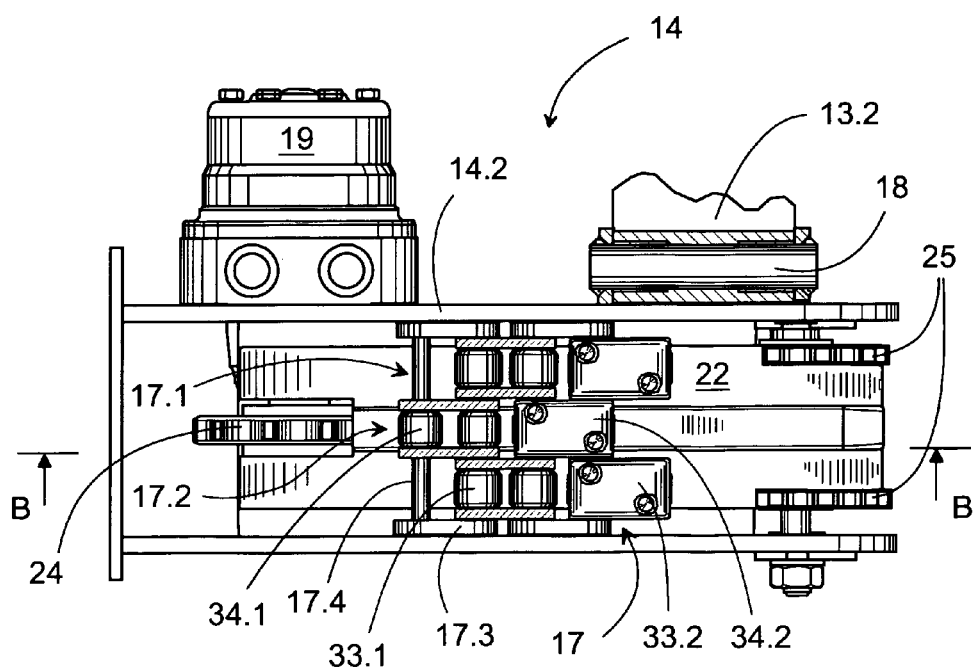
FIG. 3 shows a top view of the feed device of FIG. 2, with the crawler track partly removed

FIG. 2 shows one construction of feeder device 14 (cross-section B - B, FIG. 3). In this case, the feeder device, which is seen in part cross-section from the side, is equipped with a curved roll base 22. The tree being processed is marked with the reference number 1. The crawler track is marked generally with the reference number 17 and is driven by a drive sprocket 24. At the opposite end, it travels around two idlers 25, which are, however, narrow in the area of the outer rollers and preferably have truncated teeth. The idler can, however, also be smooth, or be replaced entirely with a roll guide. The teeth 24.1 of the drive sprocket 24 transmit power to the middle row of links of the crawler track 17. The need for these teeth 24.1 to fit between the opposing rollers limits the size of the rollers relative to their spacing. This limitation does not apply to the outer rows of links, and in them the diameter of the rollers can approach the dimension of their spacing.

FIG. 3 shows a top view of the feeder device 14, with the crawler track 17 nearly entirely removed and partly cut open. The figure shows the roll base 22, the drive sprocket 24, the hydraulic motor 19 that rotates it, the suspension arm 13.2 of the feeder device, the suspension joint 18, and the idlers 25. The crawler track 17 fills the space between the frame side plates 14.2 with a small tolerance. Preferably, the crawler track 17 is staggered according to the figure. The pin 17.4 locked to the crawler side plates 17.3 secures the links 33.2 and 34.2 in such a way that the links 34.2 of the middle row 17.2 'are in the same phase' as the crawler side plates 17.3, while the links 33.2 of the outer rows 17.1 are staggered relative to them. The detachable roll base 22 is substantially narrower than the crawler track 17, so that at least the crawler side plates 17.3 have plenty of space to move.

Figure 4:
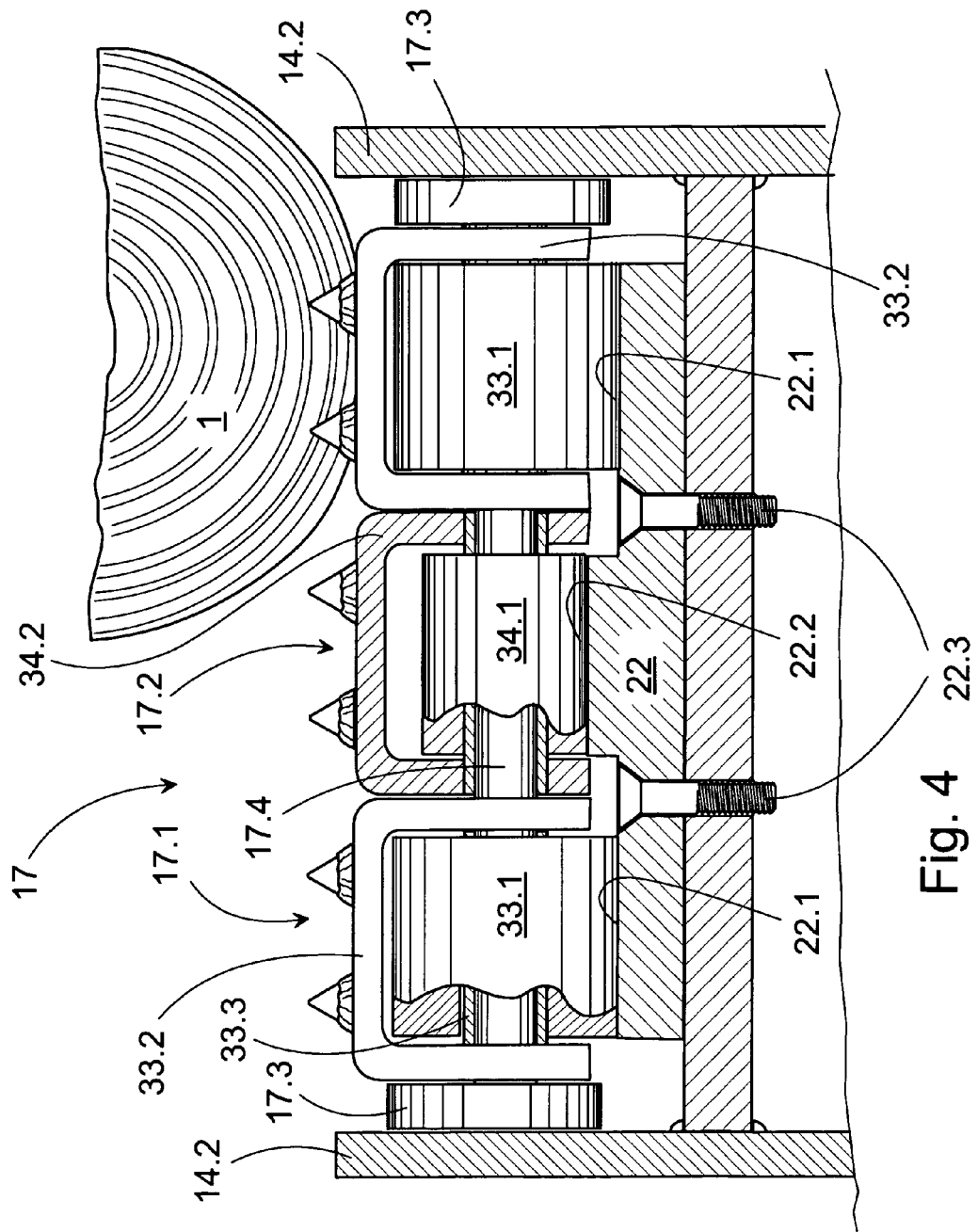
FIG. 4 shows a cross-section of the feed device, through the rolling base.

FIG. 4 shows a cross-section of the feeder device, at the point A—A in FIG. 2. The components 33.2 and 34.2 show the links of a 3-row chain. Component 17.3 is the side plate on both sides of the crawler track 17, i.e. The pin 17.4 is attached to them at both ends. In this case, the links 33.2 and 34.3 are formed in a known manner from U-shaped pieces, with grip studs welded to the web. The links can also be made from separate side plates, with a web plate welded across their ends. The gripping members can be stud welded onto the web plate, or a plate-like piece.

As will be noticed, the roller 33.1 in the links 33.2 is larger than the middle roller 34.1 in the links 34.2. These correspond to roll guides or bands 22.1 and 22.2 of the roll base. The roll base 22 is otherwise uniform, but is thicker under the middle row, to raise the roll band 22.2 to correspond to the smaller middle roller 34.1. The roll base can also be partial and divided (not shown). In this case, bolts 22.3 are used to make it detachable, but a welded joint can also be used.

The roll guides are preferably curved, with their curvature corresponding to a radius of about 1 meter, usually 0.8–1.3 m. The durability, mechanical operation, and adhesion properties will then be optimal.

Roll guides 22.1 and 22.2 may include a carbon tempered wear surface for engaging tracks 14 and 17 respectively. Carbon tempering increases the low surface carbon content of steel to the level 0.65–0.9%, in order to improve its hardenability and achieve a high surface hardness. In this case, the thickness of the carbonization layer is preferably in the range of 1–2.5 mm.

As an alterative to carbon tempering, it is possible to use either tool steel, or induction tempering in a base material with a high carbon content.

It is obvious that the invention can be varied within broad limits within the scope of the accompanying claims. The basic construction of the timber harvester can even deviate greatly from the example shown. Reference is made above to a 3-row roller chain, meaning three bands. In principle, each band could have two rows of rollers of the same size. Preferably, the term timber harvester refers to a single-grab harvester, in which there are two opposing feeder devices, the basic construction of which is shown in the said PCT publication WO 99/25526.

Although the invention has been described by reference to specific embodiments. It should be understood that numerous changes may be made. within the spirit and scone of the inventive concepts described. Accordingly, it is intended that the invention not be limited to the described embodiments. But that it have the full scope defined by the language of the following claims.

The invention claimed is:

1. A feeder device in a timber harvester, which includes a frame, a 3-row roller chain arranged to be rotated around a drive sprocket, a turnover member and roll guides, which roll guides extend for a great length of a gripping side of the feeder device, between the drive sprocket and the turnover member, and in which roller chain there are rows of links staggered relative to each other by transverse pins, comprising a middle row of links and outer rows of links, each row of links including rollers rolling in the corresponding roll guides and set in bearings in the transverse pins, and in which the drive sprocket has sprocket teeth arranged to drive the middle row of links of the roller chain through the rollers of the middle row of links, characterized in that the outer rows of links of the roller chain are equipped with rollers of a greater diameter than the rollers of the middle row of links, and the middle roll guide is correspondingly raised relative to the outer roll guides.

2. A feeder device in a timber harvester, according to claim 1, characterized in that the rollers of the outer rows have a diameter that is 10–25% greater than that of the middle rollers.

3. A feeder device in a timber harvester, according to claim 1, characterized in that the diameter of the rollers of the outer rows is 85–95% of their spacing.

4. A feeder device in a timber harvester, according to claim 1, characterized in that at least the rollers of the outer rows are equipped with bushings.

5. A feeder device in a timber harvester, according to claim 1, characterized in that the outer roll guides extend essentially to the area of the drive sprocket.

6. A feeder device in a timber harvester, according to claim 1, characterized in that the roll guides form a uniform roll base, which can be detached from the frame of the feeder device.

7. A feeder device in a timber harvester, according to claim 6, characterized in that at least a wear surface of the roll base formed by the roll guides is carbon tempered.

8. A feeder device in a timber harvester, according to claim 6, characterized in that the crawler track has side plates and the overall width of the roll guides is less than the distance between the side plates of the crawler track.

9. A feeder device in a timber harvester, according to claim 1, characterized in that the roll guides are curved, with a curvature corresponding to a radius of 0.8–1.3 m.

* * * * *